United States Patent
Chou et al.

(10) Patent No.: US 10,846,160 B2
(45) Date of Patent: Nov. 24, 2020

(54) SYSTEM AND METHOD FOR REMOTE SYSTEM RECOVERY (71) Applicant: QUANTA COMPUTER INC., Taoyuan (TW)

(72) Inventors: Chi-Tsun Chou, Taoyuan (TW); Ying-Che Chang, Taoyuan (TW); Yen-Tse Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 90 days.

(21) Appl. No.: 15/944,139

(22) Filed: Apr. 3, 2018

(65) Prior Publication Data
US 2019/0220340 A1 Jul. 18, 2019

Related U.S. Application Data

(60) Provisional application No. 62/616,644, filed on Jan. 12, 2018.

(51) Int. Cl.
*G06F 11/00* (2006.01)
*G06F 11/07* (2006.01)
(Continued)

(52) U.S. Cl.
CPC ...... *G06F 11/0757* (2013.01); *G06F 11/0709* (2013.01); *G06F 11/1438* (2013.01);
(Continued)

(58) Field of Classification Search
CPC .............. G06F 11/0757; G06F 11/004; G06F 11/0751; G06F 11/30
(Continued)

(56) References Cited

U.S. PATENT DOCUMENTS

2006/0236150 A1* 10/2006 Lintz, Jr. ............. G06F 11/1417
714/6.13
2010/0153034 A1* 6/2010 Kosugi ................. H04L 1/1887
702/58
(Continued)

FOREIGN PATENT DOCUMENTS

CN 104598329 A 5/2015
CN 105224049 A 1/2016
(Continued)

OTHER PUBLICATIONS

TW Office Action for Application No. 107126547, dated Jun. 11, 2019, w/ First Office Action Summary.
(Continued)

*Primary Examiner* — Sarai E Butler
(74) *Attorney, Agent, or Firm* — Nixon Peabody LLP (57) ABSTRACT

The present disclosure provides a system and method for resetting a hang-up baseboard management controller (BMC), or another component of a server system using a hardware watch-dog-timer (HW WDT) circuit and/or complex programmable logic device (CPLD). The HW WDT circuit can monitor heartbeat signals from the BMC, and determine the health condition of the BMC. In an event that the BMC's health condition fails to meet a predefined criterion, the HW WDT circuit generates a reset signal to reset the BMC. The CPLD can collect from the BMC, health information of components of the server system. The CPLD can also collect the BMC's health condition from the HW WDT circuit. Upon determining which specific component of the server system hangs up, the CPLD can generate a reset signal to reset the specific component.

16 Claims, 4 Drawing Sheets

(51) Int. Cl.
*G06F 11/14* (2006.01)
*G06F 11/30* (2006.01)
*G06F 11/34* (2006.01)

(52) U.S. Cl.
CPC ...... *G06F 11/1441* (2013.01); *G06F 11/3006* (2013.01); *G06F 11/3058* (2013.01); *G06F 11/3409* (2013.01); *G06F 2201/88* (2013.01)

(58) Field of Classification Search
USPC .......................................................... 714/47.2
See application file for complete search history.

(56) References Cited

U.S. PATENT DOCUMENTS

| | | | | |
|---|---|---|---|---|
| 2011/0004780 A1* | 1/2011 | Hirata | ................... | G06F 11/073 |
| | | | | 714/2 |
| 2012/0137179 A1* | 5/2012 | Chin | ................... | G06F 11/2284 |
| | | | | 714/36 |
| 2013/0080840 A1* | 3/2013 | Baba | ................... | G06F 11/3006 |
| | | | | 714/47.1 |
| 2014/0195861 A1* | 7/2014 | Singh | ................... | G06F 11/076 |
| | | | | 714/47.2 |
| 2014/0201578 A1* | 7/2014 | Kosut | ................ | G06F 11/0757 |
| | | | | 714/55 |
| 2015/0205676 A1* | 7/2015 | Zheng | ................... | G06F 9/4406 |
| | | | | 714/15 |
| 2016/0000495 A1* | 1/2016 | Elliott | ................ | A61B 18/1233 |
| | | | | 606/34 |
| 2016/0034012 A1* | 2/2016 | Sahu | ..................... | G06F 1/3206 |
| | | | | 713/320 |
| 2016/0328300 A1 | 11/2016 | Rahardjo et al. | | |
| 2017/0070320 A1* | 3/2017 | Choi | ..................... | H04L 1/245 |
| 2017/0185495 A1 | 6/2017 | Jau et al. | | |
| 2017/0269984 A1 | 9/2017 | Idapalapati et al. | | |
| 2018/0059752 A1* | 3/2018 | Khatri | ..................... | G06F 1/28 |

FOREIGN PATENT DOCUMENTS

| | | |
|---|---|---|
| CN | 107145428 A | 9/2017 |
| JP | 2001014001 A | 1/2001 |
| JP | 2011048534 A | 3/2011 |
| TW | 201118564 A | 6/2011 |
| TW | 201441930 A | 11/2014 |
| TW | 201621539 A | 6/2016 |
| TW | 201714085 A | 4/2017 |

OTHER PUBLICATIONS

TW Search Report for Application No. 107126547, dated Jun. 11, 2019, w/ First Office Action.
Extended European Search Report for EP Application No. 18192443.2, dated Feb. 21, 2019.
TW Office Action for Application No. 107126547, dated Oct. 23, 2019, w/ Second Office Action Summary.
TW Search Report for Application No. 107126547, dated Oct. 23, 2019, w/ Second Office Action.
JP Office Action for Application No. 2018-171266, dated Oct. 8, 2019, w/ Second Office Action Summary.

* cited by examiner

SYSTEM AND METHOD FOR REMOTE SYSTEM RECOVERY

CROSS-REFERENCE TO RELATED APPLICATION

This application claims priority to and the benefit of U.S. Provisional Application No. 62/616,644, entitled "Remote System Recovery Mechanism" and filed on Jan. 12, 2018. The contents of that application are hereby incorporated by reference in their entirety as if fully set forth herein.

BACKGROUND

The disclosure generally relates to system recovery in a computing system.

BACKGROUND

In server architecture, a server system typically has a baseboard management controller (BMC). A BMC is used to monitor system management status (e.g., thermal and power), and control the server system. System management functions controlled by the BMC are typically critical to the server system.

However, if a BMC is malfunctioning, inoperative, or hangs, the performance and capability of the server system can be severely impacted.

SUMMARY

Systems and methods, in accordance with various examples of the present disclosure, provide a solution to the above-mentioned problems by resetting a hang-up baseboard management controller (BMC) or another component of a server system using a hardware watch-dog-timer (HW WDT) circuit and/or complex programmable logic device (CPLD). The HW WDT circuit can monitor heartbeat signals from the BMC, and determine health condition of the BMC. In an event that the BMC's health condition fails to meet a predefined criterion, the HW WDT circuit generates a reset signal to reset the BMC. The CPLD can collect, from the BMC, health information of components of the server system, and collect BMC's health condition from the HW WDT circuit. Upon determining which specific component of the server system hangs up, the CPLD can generate a reset signal to reset the specific component.

In some implementations, the CPLD comprises two or more parts (e.g., a first CPLD part and a second CPLD part). The first CPLD part can be disposed on a motherboard of the server system while the second CPLD part can be disposed on a backplane of the server system. Both the first CPLD part and the second CPLD part are connected to the BMC via an inter-integrated circuit (I²C) channel. The first CPLD part can collect health information of components of the server system from the BMC, and collect the BMC's health condition from the HW WDT circuit. The second CPLD part can serve as a redundant backup of the first CPLD part, and/or directly collect health information of a plurality of power supply units (PSUs) of the server system. In some examples, either the first CPLP part or the second CPLD part can send a reset signal after receiving a resume and rest (RSM_RST) signal. In some examples, the first CPLP can handle power and reset sequence of the server system.

In some implementations, the server system further comprises a physical layer (PHY) integrated-circuit (IC) to communicate with a remote device via a network. The PHY IC can receive management messages from an administrator or the remote device, and communicate with the first CPLD part and the BMC via power management event (PME) signals. In some examples, the remote device or the administrator may be enabled to remotely reset the BMC or a specific component of the server system via the PHY IC 112 and the first CPLD part. In some examples, the PHY IC acts as a bridge between the BMC and a RJ45 connector. The PHY IC can communicate with the BMC via a RGMII signal while communicate with the RJ45 connector via a PHY_M-DIP signal.

In some implementations, the BMC comprises a software WDT. The software WDT is reset by heartbeat signals of the BMC. If the heartbeat signals of the BMC fail to reset the software WDT, the software WDT will have a time out, and generate a timeout signal to reset the BMC. In some implementations, the software WDT may perform a system power cycle, a platform controller hub (PCH) reset, and a system reset.

In some implementations, both the first CPLD part and the second CPLD part comprise a time-out detection module. The time-out detection module can monitor the reset signal sent to the BMC or another component of the server system. In response to determining that the reset signal has failed to reset a targeted component, the time-out detection module can trigger a corresponding CPLD part to resend the reset signal.

In accordance with one aspect of the present disclosure, a computer-implemented method for resetting a hang-up component of a server system, comprises: receiving, by a HW WDT circuit of the server system, heartbeat signals from a BMC of the server system; determining, by the HW WDT circuit, health condition of the BMC based upon the heartbeat signals; and resetting the BMC if the health condition of the BMC is below a predefined criterion.

In some implementations, the computer-implemented method for resetting the hang-up component of the server system, further comprises: upon receiving a management message from an administrator or a remote device, communicating, by a PHY IC, with a first CPLD via a PME signal; collecting, by the first CPLD, health information of components of the server system from the BMC; collecting, by the first CPLD, the health condition of the BMC from the HW WDT circuit; determining that a specific component of the server system hangs up, based upon collected health information of the components and the health condition of the BMC; and generating, by the first CPLD, a reset signal to reset the specific component.

In accordance with another aspect of the present disclosure, a non-transitory computer-readable storage medium storing instructions is provided. The instructions, when executed by a processor, cause the processor to perform operations comprising: receiving, by a HW WDT circuit of a server system, heartbeat signals from a BMC of the server system; determining, by the HW WDT circuit, health condition of the BMC based upon the heartbeat signals; and resetting the BMC if the health condition of the BMC is below a predefined criterion.

In some implementations, the instructions, when executed by the processor, cause the processor to perform operations further comprising: upon receiving a management message from an administrator or a remote device, communicating, by a PHY IC, with a first CPLD via a PME signal; collecting, by the first CPLD, health information of components of the server system from the BMC; collecting, by the first CPLD, the health condition of the BMC from the HW WDT circuit; determining that a specific component of the server system hangs up, based upon collected health information of the components and the health condition of the BMC; and generating, by the first CPLD, a reset signal to reset the specific component.

According to some configurations, operation condition of components of the server system can be stored on memory, hard drive, or a flash memory device of the server system. The operation condition of the components can be accessed by BMC, rack management controller (RMC), or a central processing unit (CPU) on the server system. The flash memory device can be any storage medium configured to store program instructions or data for a period of time. According to some examples, the flash storage device can be a flash drive, a random access memory (RAM), a non-volatile random-access memory (NVRAM), an electrically erasable programmable read-only memory (EEPROM), or a mailbox register.

Additional features and advantages of the disclosure will be set forth in the description that follows, and will in part be obvious from the description; or can be learned by the practice of the principles set forth herein. The features and advantages of the disclosure can be realized and obtained by means of the instruments and combinations particularly pointed out in the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for resetting a BMC or another component of a server system using a HW WDT circuit and/or CPLD. The HW WDT circuit can monitor heartbeat signals from the BMC and determine health condition of the BMC. In an event that the BMC's health condition fails to meet a predefined criterion, the HW WDT circuit can reset the BMC. The CPLD can collect, from BMC, health information of components of the server system and collect BMC's health condition from the HW WDT circuit. Upon determining which specific component of the server system is causing a problem, the CPLD can send a reset signal to reset the specific component.

Figure 1A:
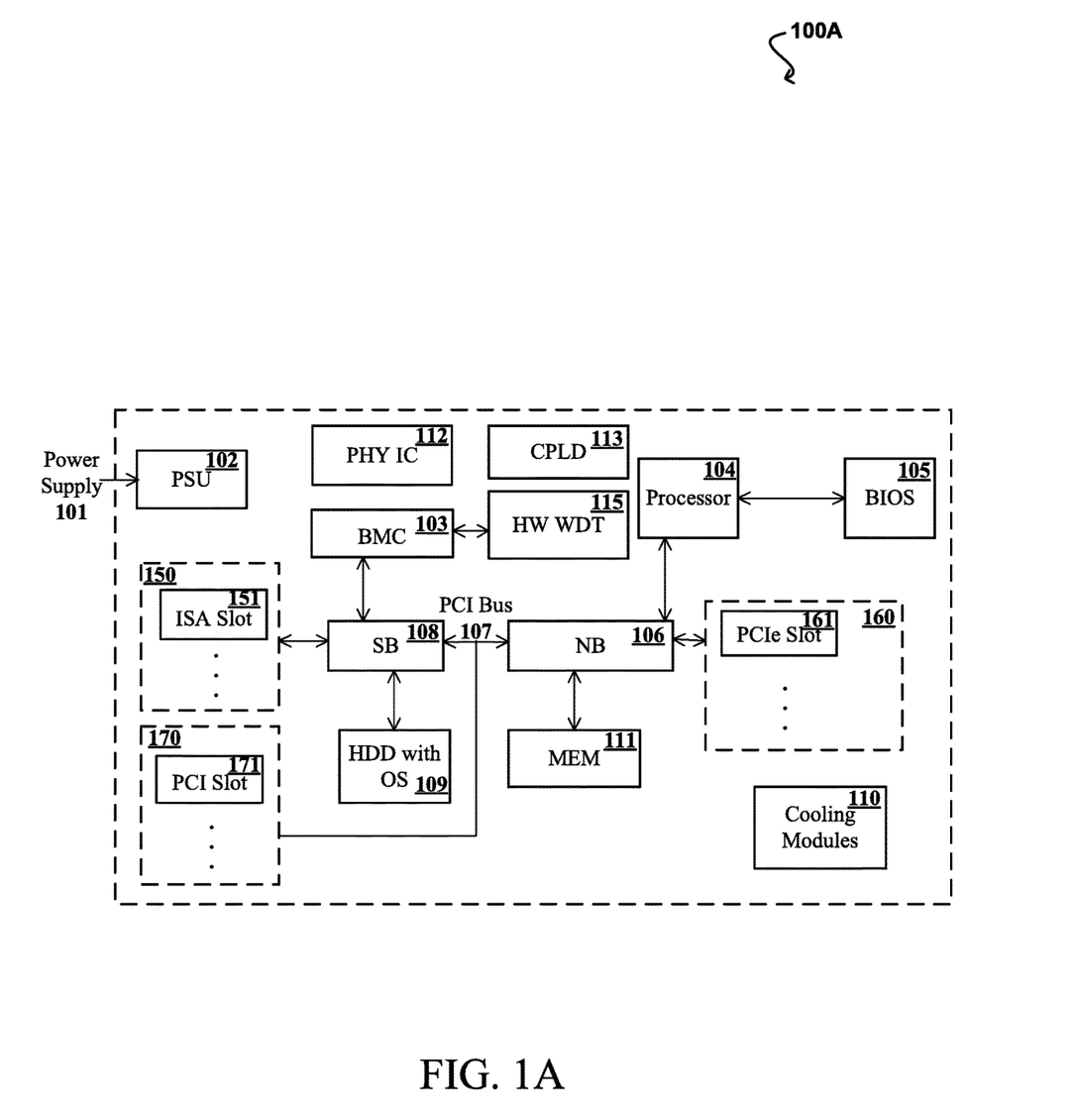
FIG. 1A is a schematic block diagram illustrating an exemplary system, in accordance with an implementation of the present disclosure.

FIG. 1A is a schematic block diagram illustrating an exemplary server system 100A, in accordance with an implementation of the present disclosure. In this example, the server system 100A includes at least one microprocessor or processor 104; a BMC 103; a PHY IC 112; a CPLD 113; a HW WDT 115; one or more cooling modules 110; a main memory (MEM) 111; at least one power supply unit (PSU) 102 that receives an AC power from an AC power supply 101, and provides power to various components of the server system 100A, such as the processor 104, north bridge (NB) logic 106, PCIe slots 160, south bridge (SB) logic 108, storage device 109, ISA slots 150, PCI slots 170, BMC 103, PHY IC 112, CPLD 113, and HW WDT 115. After being powered on, the server system 100A is configured to load software application from memory, a computer storage device, or an external storage device to perform various operations. The storage device 109 is structured into logical blocks that are available to an operating system and applications of the server system 100A. The storage device 109 is configured to retain server data even when the server system 100A is powered off.

In FIG. 1A, the memory 111 is coupled to the processor 104 via the NB logic 106. The memory 111 may include, but is not limited to, dynamic random access memory (DRAM), double data rate DRAM (DDR DRAM), static RAM (SRAM), or other types of suitable memory. The memory 111 can be configured to store firmware data of the server system 100A. In some configurations, firmware data can be stored on the storage device 109.

In some implementations, the server system 100A can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 104 can be a central processing unit (CPU) configured to execute program instructions for specific functions. For example, during a booting process, the processor 104 can access firmware data stored in the BMC 103 or the flash storage device, and execute the BIOS 105 to initialize the server system 100A. After the booting process, the processor 104 can execute an operating system in order to perform and manage specific tasks for the server system 100A.

In some configurations, the processor 104 can be multi-core processors, each of which is coupled together through a CPU bus connected to the NB logic 106. In some configurations, the NB logic 106 can be integrated into the processor 104. The NB logic 106 can also be connected to a plurality of peripheral component interconnect express (PCIe) slots 160 and an SB logic 108 (optional). The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server system 100A's chassis.

In system 100A, the NB logic 106 and the SB logic 108 are connected by a peripheral component interconnect (PCI) Bus 107. The PCI Bus 107 can support functions on the processor 104 but in a standardized format that is independent of any of the processor 104's native buses. The PCI Bus 107 can be further connected to a plurality of PCI slots 170 (e.g., a PCI slot 171). Devices connect to the PCI Bus 107 may appear to a bus controller (not shown) to be connected directly to a CPU bus, assigned addresses in the processor 104's address space, and synchronized to a single bus clock. PCI cards that can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 108 can couple the PCI Bus 107 to a plurality of expansion cards or ISA slots 150 (e.g., an ISA slot 151) via an expansion bus. The expansion bus can be a bus used for communications between the SB logic 108 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In this example, BIOS 105 can be any program instructions or firmware configured to initiate and identify various components of the server system 100A. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In system 100A, the SB logic 108 is further coupled to the BMC 103 that is connected to the at least one PSU 102 and the HW WDT 115. In some implementations, the BMC 103 can also be a rack management controller (RMC).

The BMC 103 is configured to monitor operation status of components of the server system 100A, and control the server system 100A based upon the operation status of the components. For example, the BMC 103 can monitor power being delivered to the PSU 102; power consumption of components of the server system 100A; internal temperatures of the server system 100A; and/or a temperature of a specific component of the server system 100A. Based upon the internal temperatures of the server system 100A or the temperature of the specific component, the BMC 103 may control the cooling modules 110 to increase or reduce cooling of the server system 100A or the specific component. In some implementations, the BMC 103 may scale down frequency and/or power consumption of specific components (e.g., the processor 104, the memory 111, the storage device 109 and/or bus) of the server system 100A.

In this example, the PHY IC 112 is configured to receive management messages from an administrator or the remote device (not shown), and communicate with the CPLD 113 and the BMC 103 via PME signals.

The HW WDT circuit 115 is configured to monitor heartbeat signals from the BMC 103, and determine health condition of the BMC 103. When the BMC 103's health condition is below a predefined criterion, the HW WDT circuit 115 can generate a reset signal to reset the BMC 103.

In some implementations, the HW WDT circuit 115 can be a timer that is reset by heartbeat signals of the BMC 103. If the heartbeat signals from the BMC 103 fail to reset the HW WDT 115 or there is no heartbeat signal from the BMC 103, the HW WDT circuit 115 will have a time out, and generate a timeout signal to reset the BMC 103.

The CPLD 113 is configured to collect health information of components of the server system 100A from the BMC 103, and collect BMC 103's health condition from the HW WDT circuit 115. Upon determining that a specific component of the server system 100A or the BMC 103 hangs up, the CPLD 113 can send a reset signal to reset the specific component or the BMC 103.

Figure 1B:
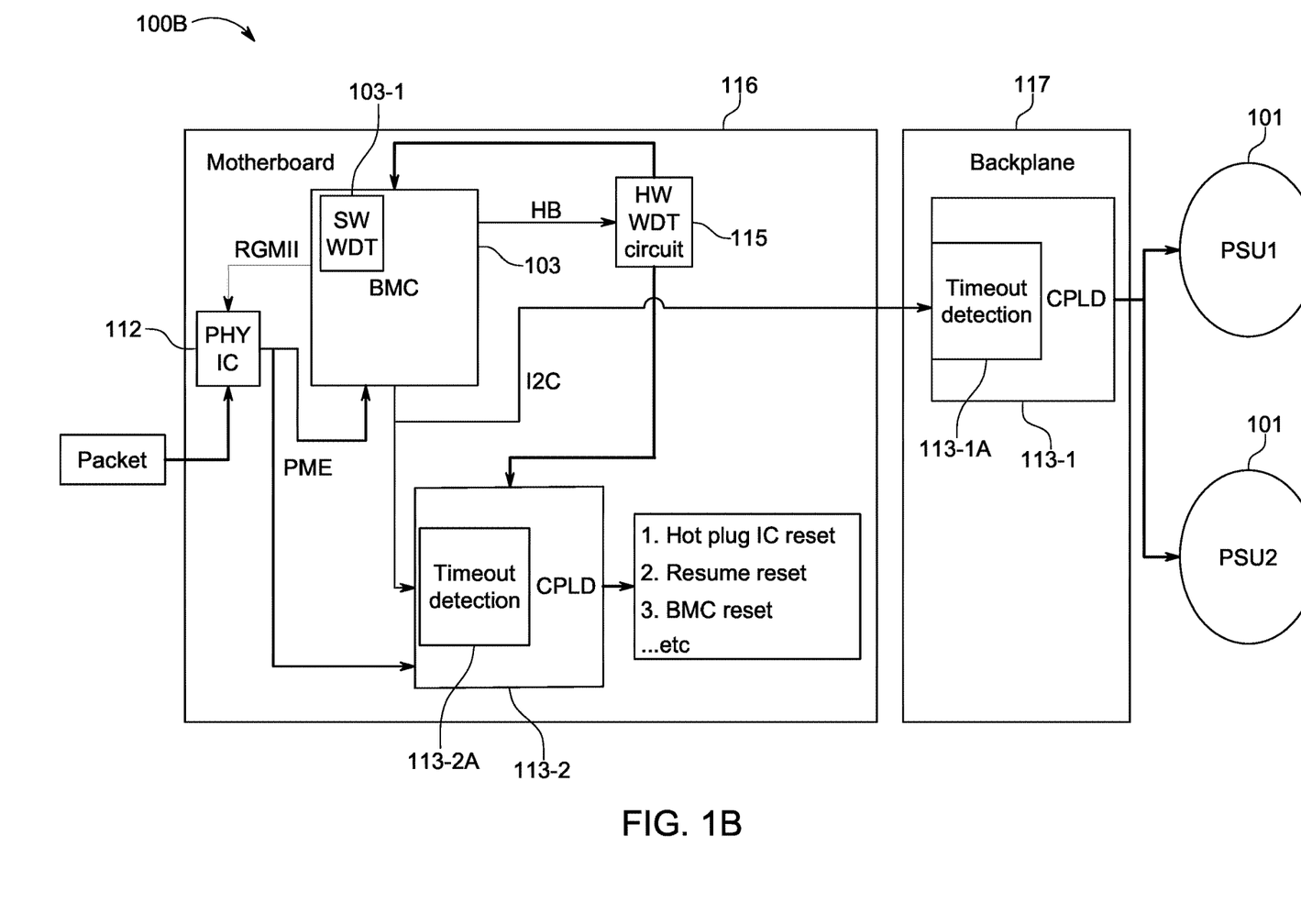
FIG. 1B is a schematic block diagram illustrating an exemplary HW WDT circuit and exemplary CPLDs for resetting a BMC and/or another component of an exemplary system, in accordance with an implementation of the present disclosure.

An example of this configuration is further illustrated in FIG. 1B. FIG. 1B is a schematic block diagram illustrating an exemplary HW WDT circuit 115 and exemplary CPLDs 113-1 and 113-2 for resetting a BMC 103 and/or other components of an exemplary system 100B, in accordance with an implementation of the present disclosure.

In this example, the server system 100B comprises PSUs 101, a motherboard 116, and a backplane 117. The backplane is connected to the PSUs 101, and a first CPLD 113-1. The motherboard 116 is connected to a PHY IC 112, a BMC 103, a HW WDT circuit 115, and a second CPLD 113-2. The first CPLD 113-1 and the second CPLD 113-2 comprise a first time-out detection module 113-1A and a second time-out detection module 113-2A, respectively. The BMC 103 is connected to the first time-out detection module 113-1A and the second time-out detection module 113-2A via I2C channels. The BMC 103 is also connected to the PHY IC 112 via a communication channel (e.g., media-independent interface (MII), reduced media-independent interface (RMII), gigabit media-independent interface (GMII), reduced gigabit media-independent interface (RGMII), 10-gigabit media-independent interface (XGMII) and serial gigabit media-independent interface (SGMII)), which enables the BMC 103 to control the PHY IC 112.

The PHY IC 112 is coupled to a remote device via a network, and configured to receive management message (s)/packet(s) from a remote device or an administrator. The PHY IC 112 is operable to communicate with the BMC 103 and the second CPLD 113-2 via PME signal(s). In some implementations, the remote device or the administrator is enabled to remotely reset the BMC 103 or a specific component of the server system 100B via the PHY IC 112 and the second CPLD 113-2.

In this example, the BMC 103 comprises a software WDT 103-1. The software WDT 103-1 is reset by heartbeat signals of the BMC 103. If the heartbeat signals of the BMC 103 fail to reset the software WDT 103-1, the software WDT 103-1 is operable to have a time out, and generate a timeout signal to reset the BMC 103.

Although only certain components are shown within the exemplary systems 100A-100B in FIGS. 1A-1B, respectively, various types of electronic or computing components that are capable of processing or storing data, or receiving or transmitting signals, can also be included in the exemplary systems 100A-100B. Further, the electronic or computing components in the exemplary systems 100A-100B can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A-100B, a variety of networking and messaging protocols can be used, including but not limited to TCP/IP, open systems interconnection (OSI), file transfer protocol (FTP), universal plug and play (UpnP), network file system (NFS), common internet file system (CIFS), Apple-Talk etc. As would be appreciated by those skilled in the art, the exemplary systems 100A-100B illustrated in FIGS. 1A-1B, respectively, are used for purposes of explanation. Therefore, a network system can be implemented with many variations, as appropriate, yet still provide a configuration of network platform in accordance with various examples of the present disclosure.

In exemplary configurations of FIGS. 1A-1B, respectively, the exemplary systems 100A-100D can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present disclosure. Numerous variations and modifications will become apparent once the above disclosure is fully appreciated.

Figure 2:
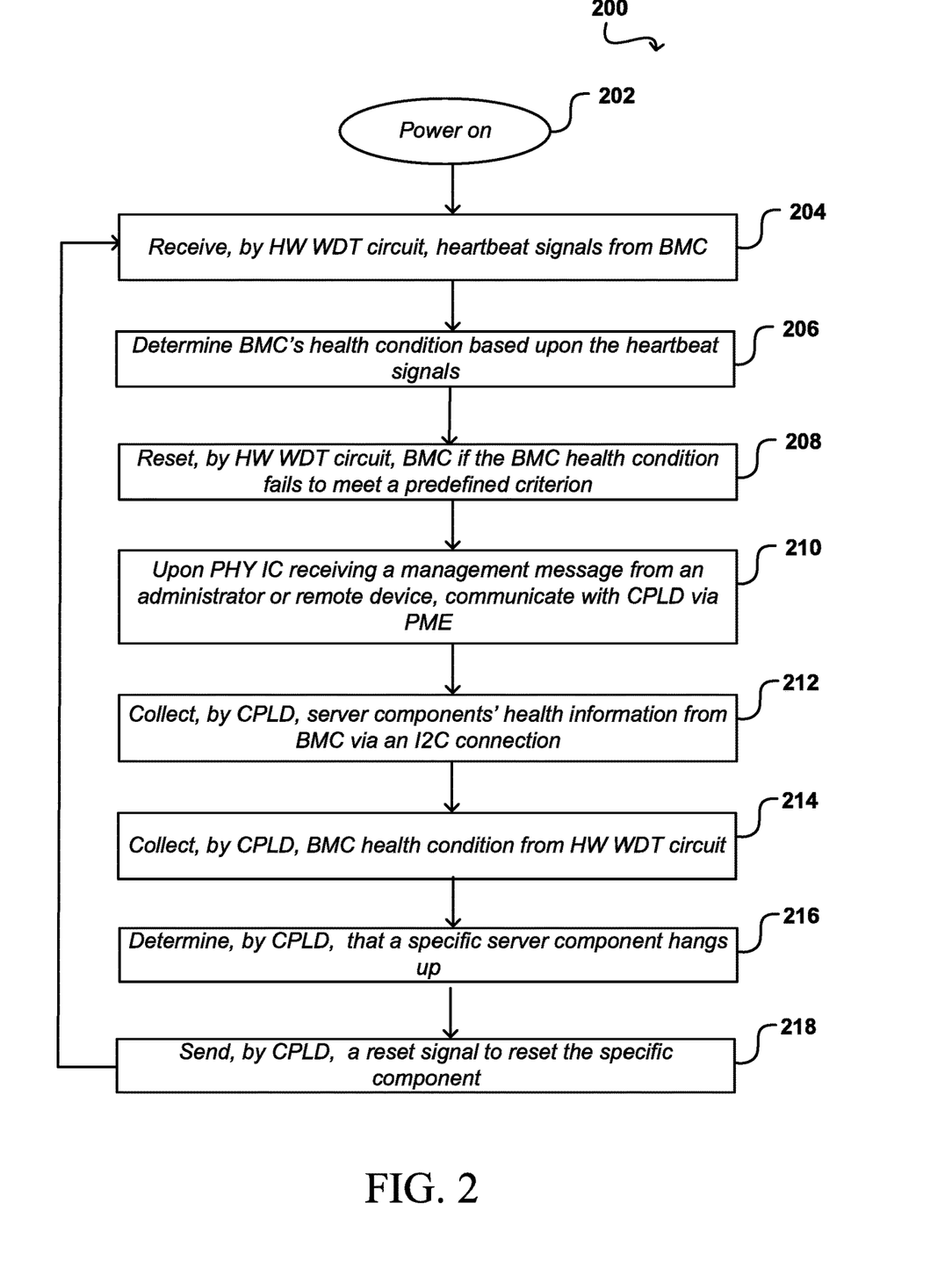
FIG. 2 is an exemplary method for resetting a hang-up component of a server system, in accordance with an implementation of the present disclosure.

FIG. 2 is an exemplary method 200 for resetting a hang-up component of a server system, in accordance with an implementation of the present disclosure. It should be understood that the exemplary method 200 is presented solely for illustrative purposes, and that in other methods in accordance with the present disclosure can include additional, fewer, or alternative steps performed in similar or alternative orders, or in parallel. The exemplary method 200 starts at step 202 by powering on the server system.

At step 204, a HW WDT circuit can receive heartbeat signals from a BMC of the server system, as illustrated in FIGS. 1A-1B. The HW WDT circuit can determine BMC's health condition based upon the heartbeat signals, at step 206, and reset the BMC if the BMC's health condition fails to meet a predefined criterion, at step 208.

In some examples, the BMC comprises a software WDT, as illustrated in FIG. 1B. The software WDT is reset by heartbeat signals of the BMC. If the heartbeat signals of the BMC fail to reset the software WDT, the software WDT generates a timeout signal to reset the BMC.

At step 210, a PHY IC can communicate with a first CPLD via a PME signal, upon receiving a management message from an administrator or the remote device, as illustrated in FIGS. 1A and 1B. The first CPLD collects health information of components of the server system from the BMC, at step 212, and collect the health condition of the BMC from the HW WDT circuit, at step 214.

At step 216, the first CPLD can determine that a specific component of the server system has hung up, based upon collected health information of the components and the health condition of the BMC. At step 218, the first CPLD can generate a reset signal to reset the specific component. In some implementations, the first CPLD can cause the BMC to scan the components of the server system, and collect health information of the components of the server system.

In some examples, the first CPLD comprises a first time-out detection module that is connected to the BMC via an I2C channel. The first time-out detection module can monitor time-out signal(s) sent to the BMC or the specific component of the server system. In response to determining that the time-out signal(s) has failed to reset a targeted component, the first time-out detection module can trigger the first CPLD to resend the time-out signal(s).

In some implementations, the server system further comprises a second CPLD. The second CPLD comprises a second time-out detection module that is connected to the BMC via another I2C channel. The second CPLD part can directly collect health information of components of the server system from the BMC, and may serve as a redundant backup of the first CPLD.

Figure 3:
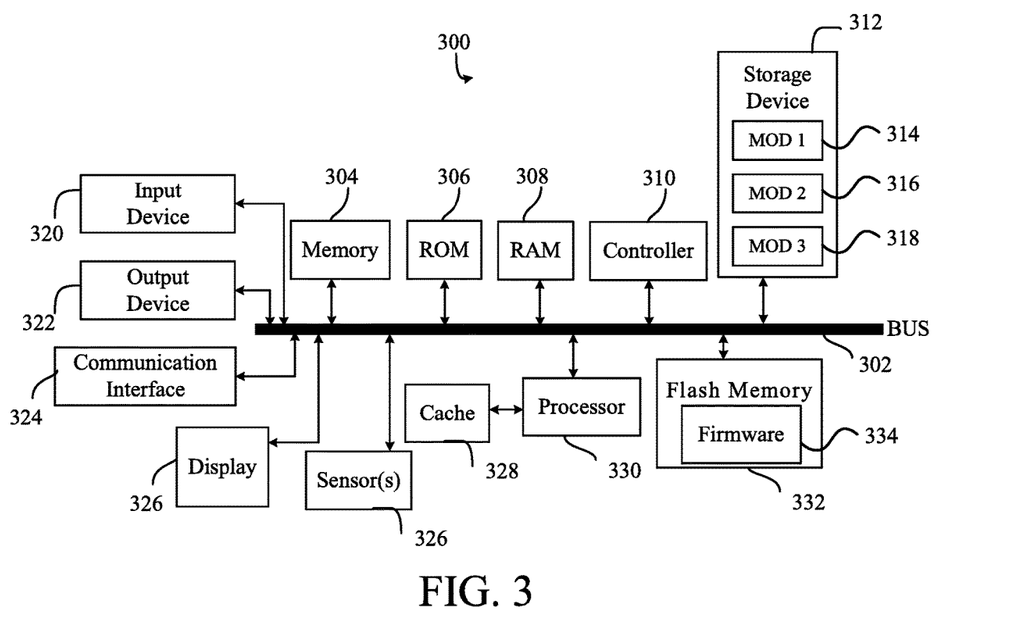
FIGS. 3 and 4 illustrate exemplary systems, in accordance with various examples of the present disclosure.
Figure 4:
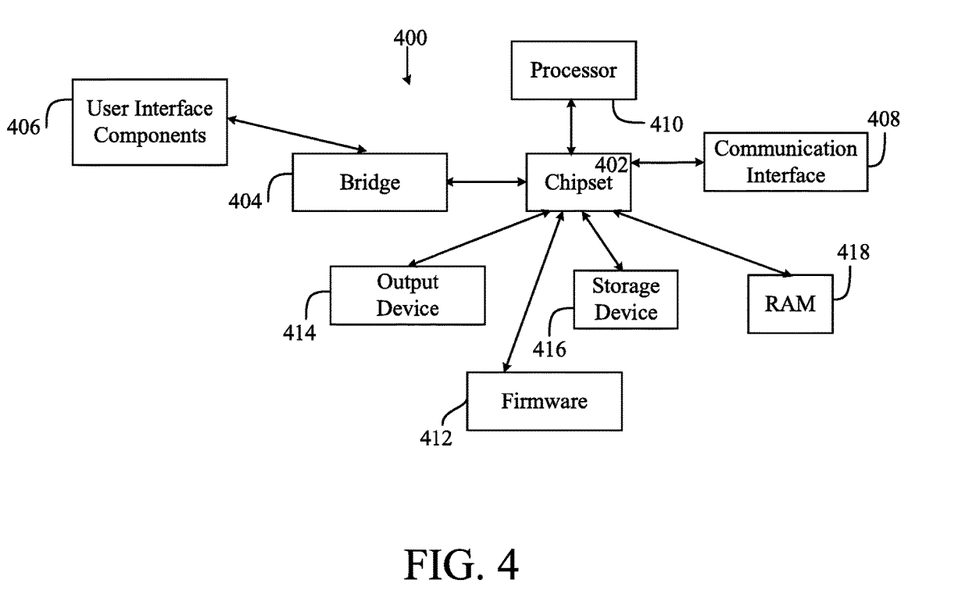

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a bus 302. The system 300 includes a processing unit (CPU or processor) 330, and a system bus 302 that couples various system components, including the system memory 304 (e.g., read only memory (ROM) 306 and random access memory (RAM) 308), to the processor 330. The system 300 can include a cache of high-speed memory connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system, and containing multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that are accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store configurations used by the firmware 334.

The firmware 334 can include a Basic Input/Output System or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set monitoring of health (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

FIG. 4 illustrates an example computer system 400 having a chipset architecture that can be used in executing the described method(s) or operations, and in generating and displaying a graphical user interface (GUI). Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display, and can read and write information to storage device 416, which can include magnetic media, and solid state media, for example. Chipset 402 can also read data from and write data to RAM 418. A bridge 404 for interfacing with a variety of user interface components 406, can be provided for interfacing with chipset 402. Such user interface components 406 can include a keyboard, a microphone, touch detection and processing circuitry, a pointing device, such as a mouse, and so on. In general, inputs to system 400 can come from any of a variety of sources, machine generated and/or human generated.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406 and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for resetting a hung-up component of a server system, comprising:
    receiving, by a hardware watch-dog-timer (HW WDT) circuit of the server system, heartbeat signals from a baseboard management controller (BMC) of the server system;
    determining, by the HW WDT circuit, a health condition of the BMC based upon the heartbeat signals;
    resetting the BMC if the health condition of the BMC fails to meet a predefined criterion;
    collecting, by a first complex programmable logic device (CPLD), health information of components of the server system from the BMC;
    determining that a hardware component of the server system other than the BMC is hung-up, based upon (i) the collected health information of the components of the server system, and (ii) the health condition of the BMC, the hardware component of the server system other than the BMC including (i) a processor, (ii) north bridge logic, (iii) south bridge logic, (iv) one or more peripheral component interconnect express (PCIe) slots, (v) one or more peripheral component interconnect (PCI) slots, (vi) one or more industry standard architecture (ISA) slots; (vii) a storage device, (viii) a physical layer integrated circuit (PHY IC), (ix) the HW WDT circuit, or (x) any combination of (i)-(ix);
    sending, by the first CPLD, a reset signal to reset the hardware component of the server system that is determined to be hung-up;
    monitoring, by the CPLD, the reset signal sent to the hardware component of the server system that is determined to be hung-up; and
    in response to determining that the reset signal has failed to reset the hardware component of the server system that is determined to be hung-up, resending the reset signal.

2. The computer-implemented method of claim 1, further comprising: upon receiving a management message from an administrator or a remote device, communicating, by a physical layer (PHY) integrated-circuit (IC), with the first CPLD via a power management event (PME) signal to cause the CPLD to collect the health information of the components of the server system from the BMC; and collecting, by the first CPLD, the health condition of the BMC from the HW WDT circuit.

3. The computer-implemented method of claim 2, wherein the first CPLD is connected to the BMC via an inter-integrated circuit ($I^2C$) channel.

4. The computer-implemented method of claim 2, wherein the BMC is connected to the PHY IC via a communication channel that enables the BMC to control the PHY IC, the communication channel being one of media-independent interface (MII), reduced media-independent interface (RMII), gigabit media-independent interface (GMII), reduced gigabit media-independent interface (RGMII), 10-gigabit media-independent interface (XGMII) and serial gigabit media-independent interface (SGMII).

5. The computer-implemented method of claim 2, wherein the server system further comprises a second CPLD, the second CPLD configured to server as a redundant backup of the first CPLD, and/or directly collect the health information of the components of the server system.

6. The computer-implemented method of claim 5, wherein the second CPLD comprises a second time-out detection module.

7. The computer-implemented method of claim 1, further comprising:
    causing the BMC to scan the components of the server system, and collect health information of the components of the server system.

8. The computer-implemented method of claim 1, wherein the BMC comprises a software WDT resettable by the heartbeat signals of the BMC, the software WDT configured to generate a timeout signal to reset the BMC in an event that the heartbeat signals of the BMC fail to reset the software WDT.

9. A system, comprising:
    a processor;
    a baseboard management controller (BMC)
    a hardware watch-dog-timer (HW WDT) circuit;
    a physical layer (PHY) integrated-circuit (IC);
    a first complex programmable logic device (CPLD); and
    a computer-readable medium storing instructions that, when executed by the processor, cause the system to perform operations comprising:
    receiving, by the HW WDT circuit, heartbeat signals from the BMC;
    determining, by the HW WDT circuit, a health condition of the BMC based upon the heartbeat signals;
    resetting the BMC if the health condition of the BMC fails to meet a predefined criterion;
    collecting, by the first CPLD, health information of components of the server system from the BMC;
    determining that a hardware component of the server system other than the BMC is hung-up, based upon (i) the collected health information of the components of the server system, and (ii) the health condition of the BMC, the hardware component of the server system other than the BMC including (i) a processor, (ii) north bridge logic, (iii) south bridge logic, (iv) one or more peripheral component interconnect express (PCIe) slots, (v) one or more peripheral component interconnect (PCI) slots, (vi) one or more industry standard architecture (ISA) slots; (vii) a storage device, (viii) a physical layer integrated circuit (PHY IC), (ix) the HW WDT circuit, or (x) any combination of (i)-(ix);
    sending, by the first CPLD, a reset signal to reset the hardware component of the server system that is determined to be hung-up;
    monitoring, by the CPLD, the reset signal sent to the hardware component of the server system that is determined to be hung-up; and in response to determining that the reset signal has failed to reset the hardware component of the server system that is determined to be hung-up, resending the reset signal.

10. The system of claim 9, wherein the computer-readable medium stores instructions that, when executed by the processor, further cause the system to perform operations comprising:
   upon receiving a management message from an administrator or a remote device, communicating, by the PHY IC, with the first CPLD via a power management event (PME) signal to cause the first CPLD to collect the health information of the components of the server system from the BMC; and
   collecting, by the first CPLD, the health condition of the BMC from the HW WDT circuit.

11. The system of claim 10, wherein the first CPLD is connected to the BMC via an inter-integrated circuit (I²C) channel.

12. The system of claim 10, wherein the BMC is connected to the PHY IC via a communication channel that enables the BMC to control the PHY IC, the communication channel being one of media-independent interface (MII), reduced media-independent interface (RMII), gigabit media-independent interface (GMII), reduced gigabit media-independent interface (RGMII), 10-gigabit media-independent interface (XGMII) and serial gigabit media-independent interface (SGMII).

13. The system of claim 9, wherein the server system further comprises a second CPLD, the second CPLD configured to server as a redundant backup of the first CPLD, and/or directly collect the health information of the components of the server system.

14. The system of claim 13, wherein the second CPLD comprises a second time-out detection module.

15. The system of claim 9, wherein the BMC comprises a software WDT resettable by the heartbeat signals of the BMC, the software WDT configured to generate a timeout signal to reset the BMC in an event that the heartbeat signals of the BMC fail to reset the software WDT.

16. A non-transitory computer-readable storage medium including instructions that, when executed by at least one processor of a server system, cause the server system to perform operations comprising:
   receiving, by a hardware watch-dog-timer (HW WDT) circuit of the server system, heartbeat signals from a baseboard management controller (BMC) of the server system;
   determining, by the HW WDT circuit, a health condition of the BMC based upon the heartbeat signals;
   resetting the BMC if the health condition of the BMC fails to meet a predefined criterion;
   upon receiving a management message from an administrator or a remote device, communicating, by a physical layer (PHY) integrated-circuit (IC), with a first complex programmable logic device (CPLD) via a power management event (PME) signal;
   collecting, by the first CPLD, health information of components of the server system from the BMC;
   collecting, by the first CPLD, the health condition of the BMC from the HW WDT circuit;
   determining that a hardware component of the server system other than the BMC is hung-up, based upon (i) the collected health information of the components of the server system, and (ii) the health condition of the BMC, the hardware component of the server system other than the BMC including (i) a processor, (ii) north bridge logic, (iii) south bridge logic, (iv) one or more peripheral component interconnect express (PCIe) slots, (v) one or more peripheral component interconnect (PCI) slots, (vi) one or more industry standard architecture (ISA) slots; (vii) a storage device, (viii) a physical layer integrated circuit (PHY IC), (ix) the HW WDT circuit, or (x) any combination of (i)-(ix);
   sending, by the first CPLD, a reset signal to reset the hardware component of the server system that is determined to be hung-up;
   monitoring, by the CPLD, the reset signal sent to the hardware component of the server system that is determined to be hung-up; and
   in response to determining that the reset signal has failed to reset the hardware component of the server system that is determined to be hung-up, resending the reset signal.

* * * * *